UNITED STATES PATENT OFFICE.

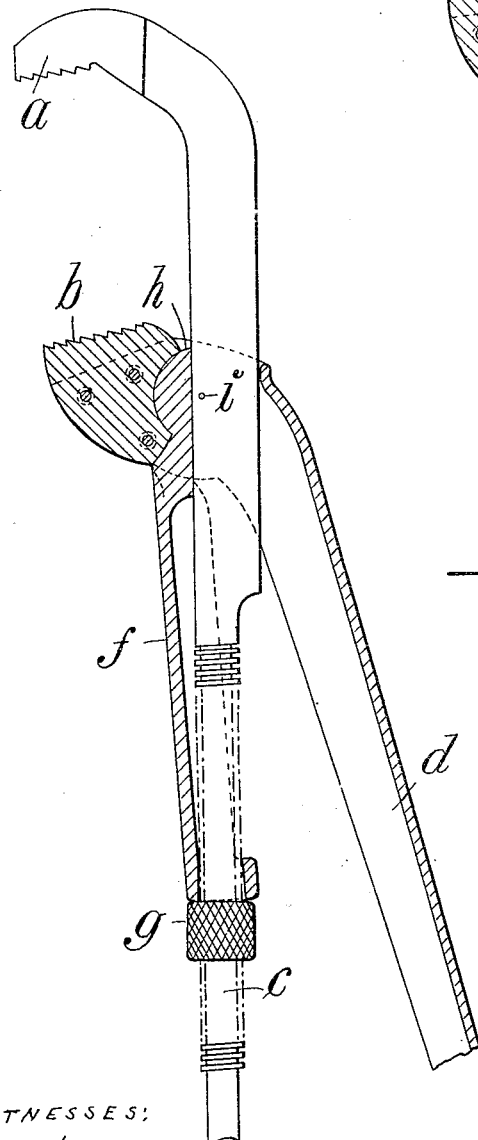
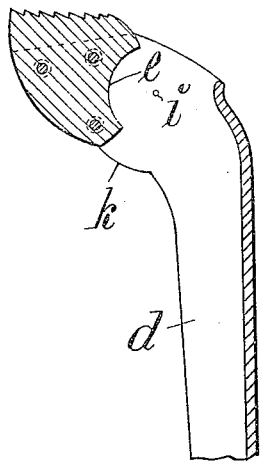
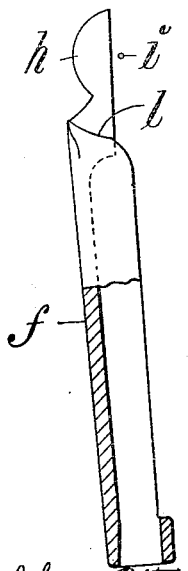

JOHAN PETTER JOHANSSON, OF ENKÖPING, SWEDEN, ASSIGNOR TO AKTIEBOLAGET ENKÖPINGS VERKSTADER, OF ENKÖPING, SWEDEN.

PIPE-TONGS.

1,112,619.  Specification of Letters Patent.  Patented Oct. 6, 1914.

Application filed June 26, 1913. Serial No. 775,835.

*To all whom it may concern:*

Be it known that I, JOHAN PETTER JOHANSSON, a subject of the King of Sweden, residing at Enköping, Sweden, have invented new and useful Improvements in Pipe-Tongs, of which the following is a specification.

The present invention relates to improvements in such already known pipe tongs, which consist of two legs engaging each other and having gripping jaws, one of said legs being guided and supported by a sleeve surrounding the other leg and resting at its lower end, against an adjusting nut screwed on to the leg.

The connection between the sleeve and the leg supported thereby, in the previous constructions, was effected by means of a rivet serving as a pivot for the rocking of the leg with respect to the sleeve. According to the present invention, for the said rivet is substituted a segmental stud or projection arranged in the sleeve and bearing against and kept in place by a correspondingly shaped recess in the jaw head of the one leg.

In the accompanying drawings, a form of the invention is illustrated. Figure 1 shows the entire tongs, in a sectional side view, Fig. 2 the lower jaw provided with a recess and a part of its leg, also in section, while Fig. 3 shows the correspondingly shaped sleeve.

$a$ and $b$ are the jaws of the tongs with their legs $c$ and $d$. The leg $d$ for instance may be pressed from sheet metal so as to obtain a U-section, and its jaw $b$ which is most exposed to wear may be exchangeable for practical reasons. The jaw $b$ thus lies down between the side flanges of the leg $d$ as shown in the drawing, and on the side facing the leg $c$ it is provided with a circular recess $e$ (Fig. 2) to which corresponds a segmental projection or stud $h$ on the sleeve $f$ which projection engages the said recess $e$ and thereby gives the leg $d$ a safe pivotal axis and a strong bearing surface in pressing together the jaws. In the same time, it connects the sleeve $f$ to the jaw $b$ so that the former always will follow the movement of the jaw $b$ and the leg $d$ with respect to the leg $c$. For strengthening the tongs each of the two sides of the leg $d$ is provided at the point of entrance of the stud into the leg with a lateral segmental projection $k$ having the same center $i$ as that of the stud $h$ and engaging correspondingly shaped recess $l$ formed in the sleeve $f$.

The adjusting of the tongs is carried on in the usual manner. If the tongs should be adjusted to a greater width, the nut $g$ is screwed down on the threaded leg, whereupon the legs are displaced relatively to each other by pulling the leg $d$ and pushing the leg $c$ until the sleeve hits the nut and prevents further movement. Should the tongs be adjusted to a smaller gripping width, the leg $d$ and the sleeve united therewith by the stud $h$ and recess $i$ are first moved toward the jaw $a$, whereupon the adjusting nut is moved after said parts. If the nut $g$ is entirely removed, the sleeve and the leg $d$ can be separated from the leg $e$, and the stud or recess of the sleeve $f$ can simultaneously be taken out from its position inside the jaw $b$, so that the sleeve will be free from the leg.

The advantages of such a construction are numerous, among which the following may be mentioned: 1. The center of rotation of the legs can be arranged differently in different tongs without losing the character of the type of the tongs and without making it necessary to use a plurality of working machines for manufacturing the tongs. 2. When the tongs are assembled, the projection on the sleeve engages the recess in the head of the leg, so that any movement of the leg will be communicated to the sleeve which is of great practical importance in the handling of the tongs. 3. The wearing surface between the jaw and the sleeve according to the present invention is larger than in the old constructions, whence it follows that the present tongs will be more durable. 4. The tongs can be taken apart in a moment so that the various parts can be readily replaced by new parts.

Having now particularly described the nature of my invention and the manner of its operation, what I claim is:

Pipe tongs consisting of two legs provided with gripping jaws, one of said legs being provided with a thread, a nut engaging said thread, a sleeve surrounding said leg and having its lower end resting against said nut, the upper end of said sleeve being provided with a projection of circular segmental shape, the chord surface of said projection bearing against said first mentioned leg, the jaw associated with the other of said legs being provided with a rounded recess engaging the curved surface of said projection, and two segmental projections, one on each side of the last mentioned leg, facing the upper end of the sleeve, said sleeve being provided with two corresponding recesses adapted to engage said two projections.

In testimony whereof I have signed my name to this specification in the presence of two subscribing witnesses.

JOHAN PETTER JOHANSSON.

Witnesses:
H. H. AMMER,
GRETA PRIM.

Copies of this patent may be obtained for five cents each, by addressing the "Commissioner of Patents, Washington, D. C."